(12) United States Patent  
Ikeura (10) Patent No.: US 10,798,348 B2
(45) Date of Patent: Oct. 6, 2020

(54) LIGHT SOURCE APPARATUS, PROJECTION TYPE DISPLAY DEVICE AND LIGHT SOURCE CONTROL METHOD

(71) Applicant: SONY CORPORATION, Tokyo (JP)

(72) Inventor: Kazumasa Ikeura, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/065,872

(22) PCT Filed: Jan. 18, 2017

(86) PCT No.: PCT/JP2017/001518
§ 371 (c)(1),
(2) Date: Jun. 25, 2018

(87) PCT Pub. No.: WO2017/135033
PCT Pub. Date: Aug. 10, 2017

(65) Prior Publication Data
US 2019/0014293 A1 Jan. 10, 2019

(30) Foreign Application Priority Data

Feb. 3, 2016 (JP) ................................. 2016-019229

(51) Int. Cl.
*H04N 5/57* (2006.01)
*H04N 9/31* (2006.01)

(52) U.S. Cl.
CPC ......... *H04N 9/3155* (2013.01); *H04N 9/3105* (2013.01); *H04N 9/3158* (2013.01); *H04N 9/3161* (2013.01); *H04N 9/3164* (2013.01)

(58) Field of Classification Search
CPC ... H04N 9/3105; H04N 9/3161; H04N 9/3155
(Continued)

(56) References Cited

U.S. PATENT DOCUMENTS

2014/0146092 A1* 5/2014 Toyooka .............. H04N 9/3155
345/690

FOREIGN PATENT DOCUMENTS

JP     2006-13171 A    1/2006
JP     2007-80534 A    3/2007
(Continued)

OTHER PUBLICATIONS

Office Action dated Sep. 17, 2019 in Japanese Patent Application No. 2016-019229 with unedited computer generated English translation.
(Continued)

Primary Examiner — Jefferey F Harold
Assistant Examiner — Jean W Desir
(74) Attorney, Agent, or Firm — Oblon, McClelland, Maier & Neustadt, L.L.P.

(57) ABSTRACT

A light source apparatus, includes a first solid-state light source and processing circuitry. The first solid-state light source is configured to output first light. The processing circuitry is configured to control a power source to supply first current to the first solid-state light source, determine whether to change the supply of the first current to the first solid-state light source to maintain a brightness level of the first light output by the first solid-state light source at a first brightness level or within a first brightness level range, and control the power source to change the supply of the first current to the first solid-state light source to output the first light at the first brightness level or within the first brightness level range in response to a determination that the supply of the first current is determined to be changed.

20 Claims, 7 Drawing Sheets (58) Field of Classification Search
USPC ......... 348/751, 756, 744, 771, 687; 345/690
See application file for complete search history.

(56) References Cited

FOREIGN PATENT DOCUMENTS

| | | |
|---|---|---|
| JP | 2007-165632 A | 6/2007 |
| JP | 2012-215755 A | 11/2012 |
| JP | 2013-41725 A | 2/2013 |
| JP | 2013-73068 A | 4/2013 |
| JP | 2014-106420 A | 6/2014 |
| JP | 2015-18618 A | 1/2015 |
| JP | 2015-19097 A | 1/2015 |
| JP | 2015-99768 A | 5/2015 |
| WO | WO 2006/110286 A2 | 10/2006 |

OTHER PUBLICATIONS

Office Action dated Mar. 17, 2020 in corresponding Japanese Patent Application No. 2016-019229, 3 pages.
Chinese Office Action dated May 26, 2020 in Chinese Patent Application No. 201780008587.2 (with English Translation).

* cited by examiner

FIG.9

LIGHT SOURCE APPARATUS, PROJECTION TYPE DISPLAY DEVICE AND LIGHT SOURCE CONTROL METHOD

CROSS REFERENCE TO RELATED APPLICATIONS

Technical Field

This application claims the benefit of Japanese Priority Patent Application JP 2016-019229 filed Feb. 3, 2016, the entire contents of which are incorporated herein by reference.

The present technology relates to a light source apparatus, projection type display device, and light source control method available for a liquid crystal projector and a DLP (Digital Light Processing) projector (a registered trademark of Texas Instruments Incorporated, USA).

Background Art

A light source such as a mercury lamp, a xenon lamp, an LED (Light Emitting Diode) and an LD (Laser Diode) is used for a projection type display device such as a projector. Among them, a solid light source such as the LED and the LD has a long life time, needs no lamp replacement in the related art, and advantageously lights immediately after tuning on.

On the other hand, the solid light source has a lowered phototransformation efficiency when a lighting time reaches a long time such as several ten thousands hours, and a brightness is gradually decreased. In particularly, the solid light source has a relatively narrow light-emitting wavelength band. Accordingly, a plurality types of solid light sources are often used in combination. When a balance of light amounts among the solid light sources is lost, a color tone may be changed.

In contrast, PTL 1 discloses a light source apparatus that an electricity supplied to a luminous body of a light source where a light output level is greatly lowered is decreased as compared with other light sources, thereby inhibiting the light output level from lowering, inhibiting a color balance of specific colors of combining light from the light source from changing, and suppressing the light output level as the specific colors from lowering.

PTL 2 discloses a light source apparatus that has no brightness unevenness and allows a correct gradation expression by detecting a temperature of a light source column where a plurality of light sources are arranged, and controlling an output for every light source column depending on a detection result.

CITATION LIST

Patent Literature

PTL 1: Japanese Patent Application Laid-open No. 2012-215755
PTL 2: Japanese Patent Application Laid-open No. 2013-73068

SUMMARY

Technical Problem

However, according to the technologies described in PTL1 and PTL2, although it is possible to prevent the color tone from changing caused by the lowering of the brightness of the solid light source, the lowering of the brightness itself cannot be prevented.

In view of the above-described circumstances, there is a need to provide a light source apparatus, a projection type display device and a light source control method that a brightness of emitted light can be maintained for a long term.

Solution to Problem

According to an embodiment of the present disclosure, there is provided a light source apparatus, including a first solid-state light source and processing circuitry. The first solid-state light source is configured to output first light. The processing circuitry is configured to control a power source to supply first current to the first solid-state light source, determine whether to change the supply of the first current to the first solid-state light source to maintain a brightness level of the first light output by the first solid-state light source at a first brightness level or within a first brightness level range, and control the power source to change the supply of the first current to the first solid-state light source to output the first light at the first brightness level or within the first brightness level range in response to a determination that the supply of the first current is determined to be changed.

According to an embodiment of the present disclosure, there is provided a method of a controller for controlling a solid-state light source that is configured to output light. The method includes controlling, by circuitry of the controller, a power source to supply current to the solid-state light source and determining, by the circuitry, whether to change the supply of the current to the solid-state light source to maintain a brightness level of the light output by the solid-state light source at a brightness level or within a brightness level range. The method further includes controlling, by the circuitry, the power source to change the supply of the current to the solid-state light source to output the light at the brightness level or within the brightness level range when the supply of the current is determined to be changed.

According to an embodiment of the present disclosure, there is provided a projector, which includes a housing, a solid-state light source, an illumination optical unit, and processing circuitry. The solid-state light source is configured to output light. The illumination optical unit includes one or more mirrors to redirect the light and one or more lenses to direct the light. The processing circuitry is configured to control a power source to supply current to the solid-state light source, determine whether to change the supply of the current to the solid-state light source to maintain a brightness level of the light output by the solid-state light source at a brightness level or within a brightness level range, and control the power source to change the supply of the current to the solid-state light source to output the light at the brightness level or within the brightness level range when the supply of the current is determined to be changed.

Advantageous Effects of Invention

As described above, according to the present technology, there is provided a light source apparatus, a projection type display device and a light source control method that a brightness of emitted light can be maintained for a long term.

DESCRIPTION OF EMBODIMENTS (Configuration of Projection Type Display Device)

Figure 1:
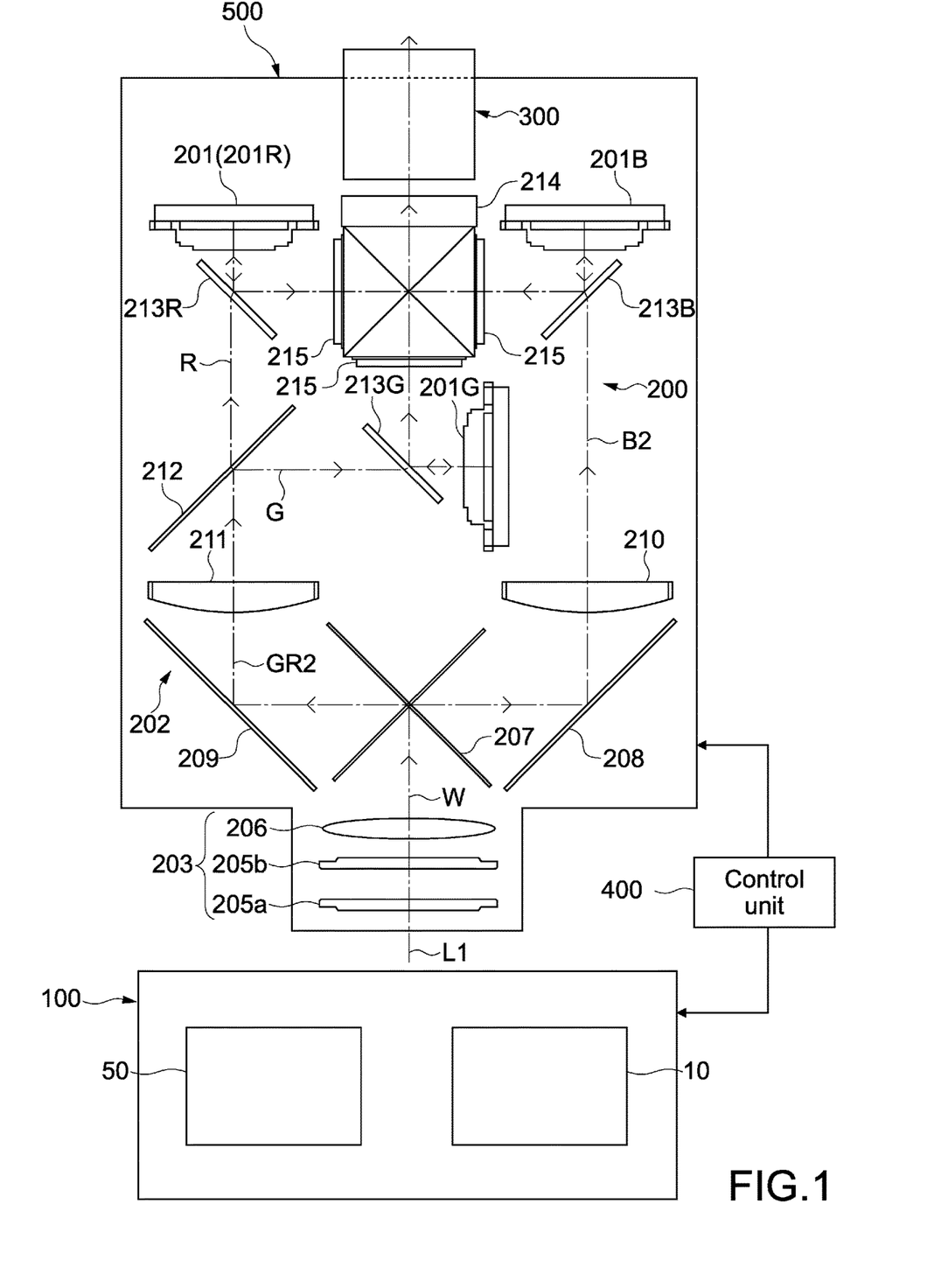
FIG. 1 is a schematic diagram showing a configuration of a projection type display device according to an embodiment of the present technology.

FIG. 1 is a schematic diagram showing a configuration example of a projection type display device 500 according to an embodiment of the present technology. The projection type display device 500 is used as a presentation or digital cinema projector. The present technology descried below is applicable to a projection type display device used for other application.

The projection type display device 500 includes a light source unit 100, an image generating unit 200 that generates an image on the basis of white light W emitted from the light source unit 100, an image projection unit 300 that projects the image generated by the image generating unit 200 on a screen (not shown), and a control unit 400.

Figure 2:
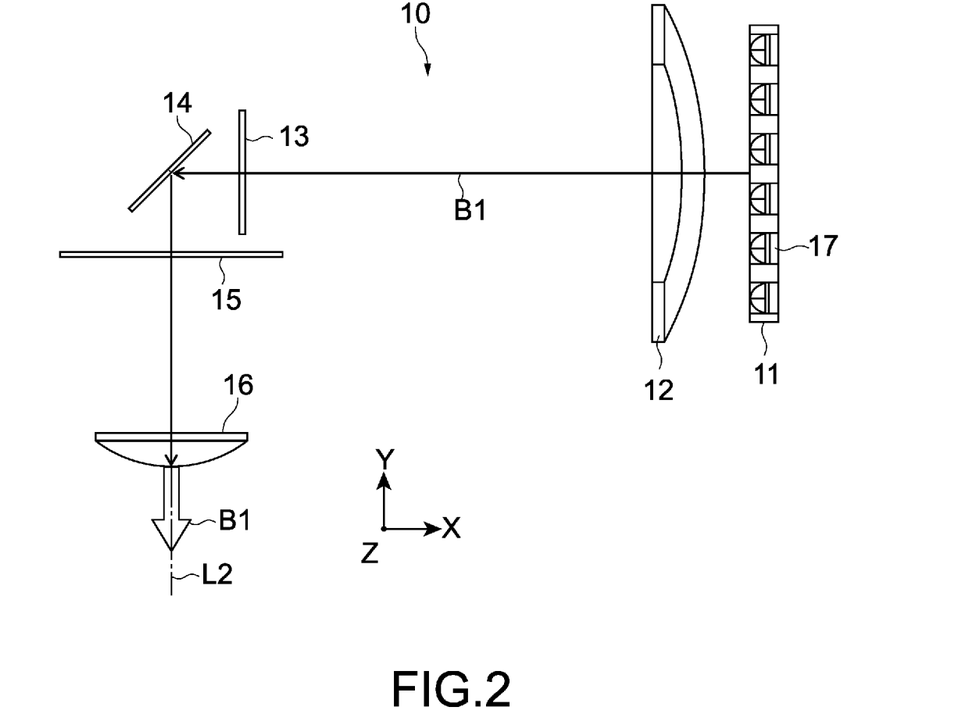
FIG. 2 is a schematic diagram showing a configuration of a B light source module included in a light source unit of the projection type display device.
Figure 3:
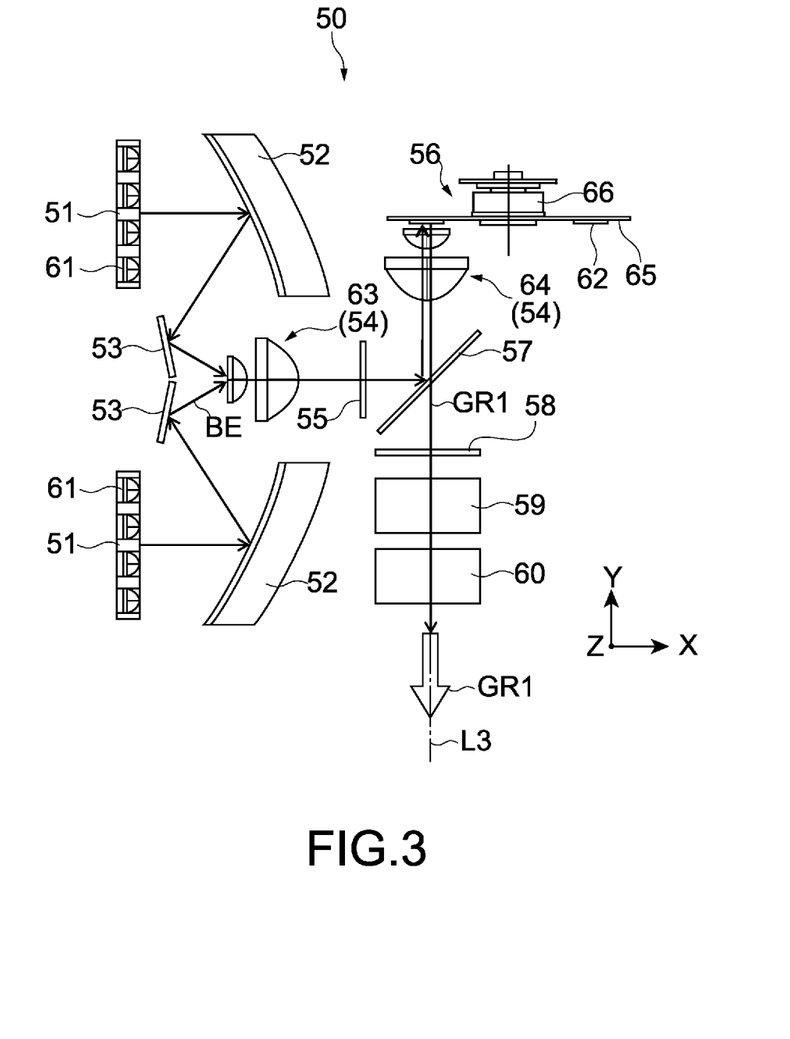
FIG. 3 is a schematic diagram showing a configuration of a GR light source module included in a light source unit of the projection type display device.

The light source unit 100 includes a B light source module 10 that emits blue light B1 in a blue light wavelength region (see FIG. 2), and a GR light source module 50 that emits light in a wavelength region from a red wavelength region to a green wavelength region (i.e., yellow light) GR1 (see FIG. 3).

The blue light B1 emitted from the B light source module 10 is synthesized with the yellow light GR1 emitted from the GR light source module 50 to generate the white light W. As shown in FIG. 1, the white light W is emitted to the image generating unit 200 along a light axis L1. Note that a color of the light emitted from each light source module is not limited, and any other light color may be emitted.

The image generating unit 200 functions as an image generating unit in this embodiment, and includes a plurality of reflective liquid crystal light bulbs (image generation element) 201, an illumination optical system 202 that leads light to each of the reflective liquid crystal light bulbs 201, and a dichroic prism 214.

The illumination optical system 202 includes an integrator optical system 203, a first dichroic mirror 207, two reflective mirrors 208 and 209, two condensing lenses 210 and 211, a second reflective mirror 212, and reflective polarizers 213R, 213G and 213B.

The integrator optical system 203 includes a set of fly-eye lenses 205a and 205b, and a condenser lens 206. By the integrator optical system 203, a brightness distribution of the white light W emitted on the light axis L1 is prepared, which is emitted to the first dichroic mirror 207.

The first dichroic mirror 207 disperses the white light W emitted from the condenser lens 206 into blue light B2 at a short wavelength side and yellow light GR2 at long wavelength side. The blue light B2 is within a wavelength band that is almost same as that of the blue light B1 emitted from the B light source module 10, and the yellow light GR2 is within a wavelength band that is almost same as that of the yellow light GR1 emitted from the GR light source module 50.

The blue light B2 dispersed by the first dichroic mirror 207 is incident on the crystal liquid light bulb 201B via the first reflection mirror 208, the first condensing lens 210 and the reflective polarizer 213B. The yellow light GR2 is incident on the second dichroic mirror 212 via the second reflection mirror 209 and condensing lens 211.

The second dichroic mirror 212 disperses the yellow light GR2 into green light G at a short wavelength side and red light R at a long wavelength side. The dispersed red light R is incident on the crystal liquid light bulb 201R via the reflective polarizer 213R. The green light G is incident on the crystal liquid light bulb 201G via the reflective polarizer 213G.

The crystal liquid light bulbs 201R, 201G and 201B modulates and reflects incident light for each pixel on the basis of a driving signal output from a panel driver included in the control unit 400. The modulated RGB three imaging lights are reflected by the reflective polarizers 213R, 213G, and 213B, and are incident on the dichroic prism 214 via the polarizer 215.

The dichroic prism 214 synthesizes the three imaging lights modulated by the crystal liquid light bulbs 201R, 201G and 201B on the same optical path, and emits to the image projection unit 300. The image projection unit 300 includes a lens and the like (not shown), and enlarges the synthesized light to a predetermined magnification to irradiate it to the screen or the like. In this way, a full-color image is displayed.

The control unit 400 controls each unit of the projection type display device 500. The control unit 400 includes a CPU (Central Processing Unit), a RAM (Random Access Memory), a ROM (Read Only Memory) and the like, for example. When the CPU loads and executes a program recorded in the ROM in advance, a variety of processing is executed. A specific configuration of the control unit 400 is not limited, and any hardware and software may be used, as appropriate.

FIG. 2 is a schematic diagram showing a configuration example of an optical system of the B light source module 10, and is a plan view of the optical system of the B light source module 10 viewed from above (viewed from a Z axis direction) of the B light source module 10.

The B light source module 10 includes a light source block 11, a condensing lens 12, a diffuser 13, a reflection mirror 14, a rotary diffuser 15, and an emit lens 16. The light source block 11 includes a plurality of solid light sources 17 that emit the blue light B1. The solid light source 17 is a light source that emits light by electroluminescence of an LD (Laser Diode), an LED (Light Emitting Diode) or the like. For example, the plurality of solid light sources 17 emit the blue light B1 where a center wavelength (peak wavelength of an emission intensity) is set to the range within the range of about 400 nm-500 nm blue light wavelength region.

The condensing lens 12 is disposed at a front of the light source block 11, and collects the blue light B1 on the diffuser 13. The blue light B1 having a wide light beam diameter by the diffuser 13 is bent about 90 degrees by the reflection mirror 14 and is reflected. As shown in FIG. 2, when an emitting direction of the solid light source 17 is set to an X axis direction, the blue light B1 is reflected by the reflection mirror 20 in a Y axis direction.

The rotary diffuser 15 is rotary-driven by a motor or the like (not shown) and emits the blue light B1 toward the emit lens 16. The emit lens 16 emits the blue light B1 along a light axis L2 extending in the Y axis direction.

FIG. 3 is a schematic diagram showing a configuration example of an optical system of the GR light source module 50, and is a plan view of the optical system of the GR light source module 50 viewed from above (viewed from a Z axis direction) of the GR light source module 50. XYZ coordinate axes are set in the same direction in FIG. 2.

The GR light source module 50 includes two light source blocks 51, two aspherical mirrors 52, two plane mirrors 53, a condensing lens system 54, a diffuser 55, a phosphor wheel 56, a separation filter 57, an emit lens 58, a reflection mirror 59, and an emitting mirror 60.

Each of the two light source blocks 51 includes a plurality of solid light sources 61. The solid light source 61 is a light source that emits light by electroluminescence of an LD (Laser Diode), an LED (Light Emitting Diode) or the like. The plurality of solid light sources 61 are used as exciting light sources that emit exciting light for exciting a phosphor layer 62 formed on a phosphor wheel 56. In this embodiment, the blue light BE where a center wavelength is set within the range of about 400 nm-500 nm blue light wavelength region is emitted as the exciting light.

As shown in FIG. 3, the light source block 51 is arranged such that an emitting direction of each of the solid light sources 61 is in parallel with the X axis direction. In other words, the light source block 51 is arranged so as to face to the light source block 11 of the B light source module 10 in the X axis direction.

The two aspherical mirrors 52 are arranged forward of the light source block 51, and reflects and collects the blue light BE. The blue light BE emitted from the light source block 51 is reflected so as to turn back again toward between the two light source block 51 by the aspherical mirrors 52. The reflected blue light BE is reflected by the two plane mirror 53 so as to turn back again, and is collected at an incident port of the condensing lens system 54.

The condensing lens system 54 includes a lens group 63 at an incident side that diffuses and almost parallels the collected blue light BE and a lens group 64 at an emitting side that collects the paralleled blue light BE on the phosphor layer 62 formed on the phosphor wheel 56. The lens group 63 at an incident side and the lens group 64 at an emitting side are arranged so as to cross each other at about 90 degrees.

The diffuser 55 and the separation filter 57 are arranged in this order at forward of the lens group 63 at an incident side. The blue light BE emitted from the lens group 63 at an incident side is incident on the separation filter 57 via the diffuser 55. The separation filter 57 reflects the blue light BE toward the lens group 64 at an emitting side. The reflected blue light BE is collected by the lens group 64 at an emitting side on the phosphor layer 62 of the phosphor wheel 56.

The phosphor wheel 56 is arranged at a rear side of the lens group 64 at an emitting side. The phosphor wheel 56 is a reflective phosphor wheel, and includes a substrate 65 formed of a crystalline member such as sapphire, for example, and the phosphor layer 62 formed on the substrate 65.

The phosphor layer 62 includes a fluorescent substance that is excited by the blue light BE and emits fluorescent light. When the fluorescent substance is excited, the blue light BE is converted into the yellow light GR1. The yellow light GR1 generated from the phosphor layer 62 is reflected by the substrate 65 toward the lens group 64 at an emitting side.

The phosphor wheel 56 is rotary-driven by a motor 66. In this manner, the point where the excited light is collected is moved relatively, thereby inhibiting saturation or ghosting of the phosphor. As the fluorescent substance included in the phosphor layer 62, an YAG (Yttrium Aluminum Garnet) based phosphor is used, for example. When other phosphor is used, the present technology is applicable.

The lens group 64 at an emitting side almost parallels the yellow light GR1 generated from the phosphor layer 62, and emits it to the separation filter 57. The yellow light GR1 transmits through the separation filter 57, and is incident on the reflection mirror 59 via the emit lens 58. The reflection mirror 59 reflects the yellow light GR1 toward the emitting mirror 60 arranged downward in the X axis direction. The emitting mirror 60 emits the yellow light GR1 along a light axis L3 extending in the Y axis direction.

The blue light B1 emitted along the light axis L2 is synthesized with the yellow light GR1 emitted along the light axis L3 to generate the white light W shown in FIG. 1. For example, the separation filter that reflects the yellow light GR1, and transmits the blue light B1 is used as the emitting mirror 60. At a rear side of the emitting mirror 60, the emit lens 16 shown in FIG. 2 is arranged so as to match the light axis L2 with the light axis L3. In this way, the blue light B1 and the yellow light GR1 can be emitted along the same light axis.

The method and the configuration of emitting the blue light B1 and the yellow light GR1 along the same light axis are not limited. For example, it may be configured that an optical system that leads the blue light BE and the yellow light GR1 along the same light axis may be added.

The configuration of the optical system of the B light source module 10, and the configuration of the optical system of the GR light source module 50 are not limited to the above. A configuration of a holding mechanism that holds these optical systems is entirely not limited, and may be designed, as appropriate.

(Configuration of Control Unit)

Figure 4:
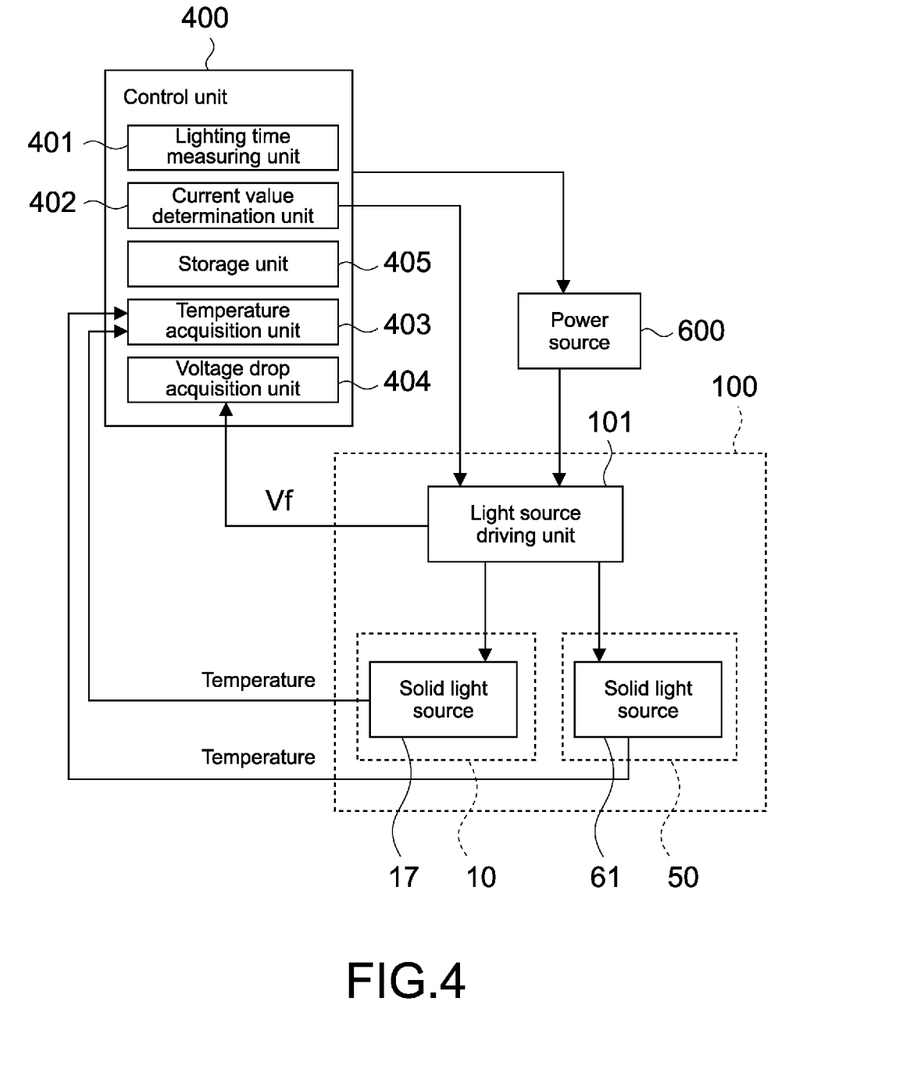
FIG. 4 is a schematic diagram showing a configuration of a control unit included in a light source unit of the projection type display device.

The control unit 400 controls each unit of the projection type display device 500 as described above. FIG. 4 is a block diagram of the control unit 400 and an object to be controlled. As shown in the same figure, the control unit 400 includes a lighting time measuring unit 401, a current value determination unit 402, a temperature acquisition unit 403, a voltage drop acquisition unit 404 and a storage unit 405. The control unit 400 is connected to a power source 600, a light source driving unit 101, a solid light source 17 and solid light source 61.

The power source 600 is mounted on the projection type display device 500, and supplies a current to the light source driving unit 101 by a control of the control unit 400.

The light source driving unit 101 is mounted to the light source unit 100, and is connected to the solid light source 17 and the solid light source 61. As described above, the plurality of solid light sources 17 and solid light sources 61 are provided, but FIG. 4 shows only one of them. The light source driving unit 101 includes a CPU and a ROM. When the CPU loads and executes a program recorded in the ROM in advance, a variety of processing is executed.

The current value determination unit 402 determines a current value of a driving current of each of the solid light source 17 and the solid light source 61, and instructs the light source driving unit 101. The light source driving unit 101 supplies the current supplied from the power source 600 to the solid light source 17 and the solid light source 61 in an amount instructed from the current value determination unit 402. A duty cycle determination unit may be provided, in addition or as an alternative to, the current value determination unit 402 according to certain embodiments. The duty cycle determination unit, in one embodiment, determines a duty cycle between light-on and light-off times of a solid-state light source (e.g., the solid light source 17 and/or the solid light source 61).

The solid light source 17 receives the driving current supplied from the light source driving unit 101, generates electroluminescence emission, and generates the above-described blue light B1. The solid light source 61 receives the driving current supplied from the light source driving unit 101, generates electroluminescence emission, and generates the above-described blue light BE.

Each of the solid light source 17 and the solid light source 61 includes a temperature sensor. The temperature acquisition unit 403 acquires the temperature of the solid light source 17 and the solid light source 61 from the temperature sensor. The light source driving unit 101 measures a voltage drop (Vf in the figure) of the solid light source 17 and the solid light source 61, and the voltage drop acquisition unit 404 acquires the voltage drop of the solid light source 17 and the solid light source 61 from the light source driving unit 101.

The storage unit 405 stores a current increase curve as described later. The current value determination unit 402 read out the current increase curve from the storage unit 405, which may be used for determining the current value.

The control unit 400 has the configuration as described above. The control unit 400 includes a panel driver (not shown) in addition to the above-described configuration, may control the crystal liquid light bulb 201 (see FIG. 1) depending on the image signal input from an external device such as a PC, and may generate an image.

(Operation of Control Unit)

Figure 5:
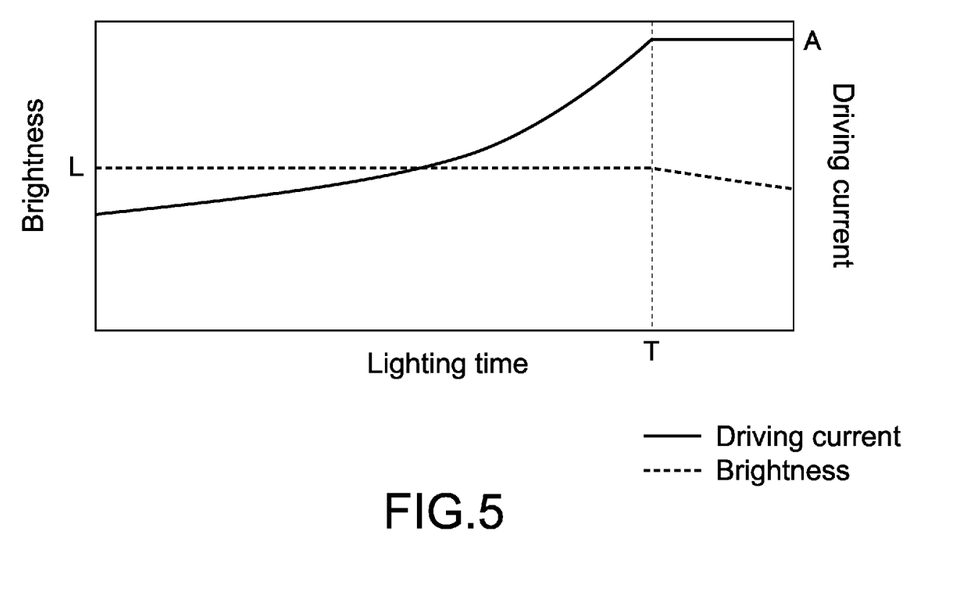
FIG. 5 is a graph showing a time change of a driving current of a solid-state light source vs a brightness determined by the control unit included in the projection type display device.

The operation of the control unit 400 will be described. FIG. 5 is a graph showing a time change between the driving current and the brightness according to this embodiment. The horizontal axis represents a lighting time, which is an elapsed time from the lighting start of the solid light source 17 and the solid light source 61. A driving current of the vertical axis (right scale) is the driving current supplied to the solid light source 17 and the solid light source 61, and a brightness of the vertical axis (left scale) is the brightness of the white light W emitted from the light source unit 100 (see FIG. 1). The vertical axis and the horizontal axis are the same in the following graphs.

As shown in the same figure, the control unit 400 increases the current value of the driving current depending on the elapsed time from the lighting start of the solid light source 17 and the solid light source 61. Specifically, the lighting time measuring unit 401 measures the lighting time of the solid light source 17 and the solid light source 61, and supplies to the current value determination unit 402. The current value determination unit 402 determines the current value of the driving current depending on the lighting time of the solid light source 17 and the solid light source 61.

At this time, the current value determination unit 402 increases the current value of the driving current as the lighting time is longer. The current value determination unit 402 may increase the current value until the lighting time reach a time T. The time T is forty thousand hours, for example, and is desirably at least ten thousand hours or more. A current A is 2000 mA, for example, and a brightness L is 2000 lm (D65 conversion), for example.

Figure 6:
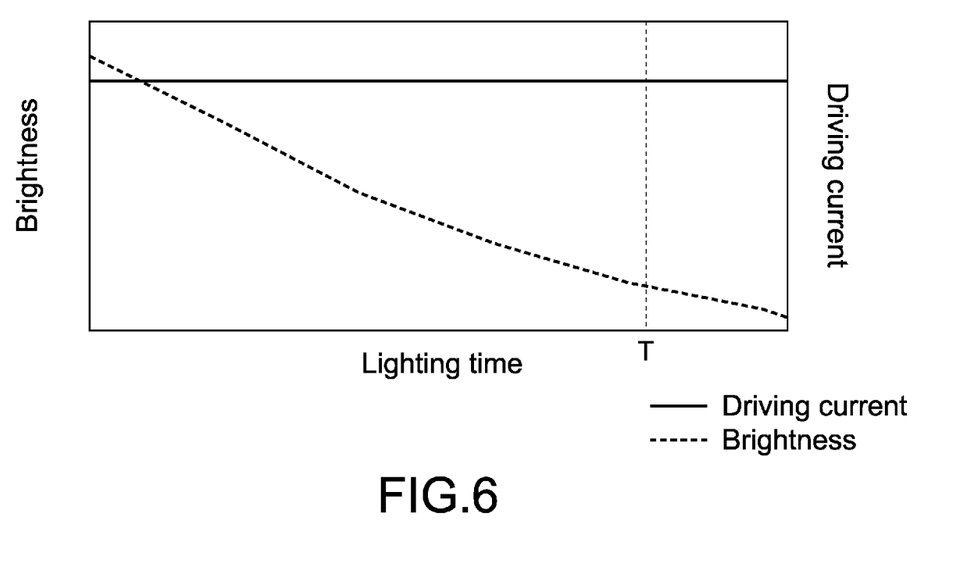
FIG. 6 is a graph showing a time change of a driving current and a brightness according to a comparative embodiment.

FIG. 6 is a graph showing a time change between the driving current and the brightness when the driving current is set to uniform for comparison. As shown in the same figure, when the current of the driving current is uniform, the brightness of the white light W is gradually lowered. This is because in the light source that emits light by electroluminescence such as the solid light source 17 and the solid light source 61, a phototransformation efficiency is gradually decreased as the lighting time is elapsed.

In contrast, as shown in FIG. 5, as the lighting time is longer, the current value of the driving current is increased, thereby maintaining the brightness of the white light W uniform.

The storage unit 405 has a current increase curve in advance as shown in FIG. 5. The current value determination unit 402 can determine the current value depending on the lighting time by referring the current increase curve acquired from the storage unit 405. The shape of the current increase curve is not limited to that shown in FIG. 5, and can be such that the brightness of the solid light source 17 and the solid light source 61 is maintained constant.

Also, the control unit 400 may determine the driving current on the basis of a measured value acquired from the solid light source 17, the solid light source 61 and the light source driving unit 101. Specifically, the temperature acquisition unit 403 may acquire the temperature of each solid light source from the solid light source 17 and solid light source 61, and supply to the current value determination unit 402. Also, the voltage drop acquisition unit 404 may acquire the voltage drop of the solid light source 17 and the solid light source 61 from the light source driving unit 101, and supply to the current value determination unit 402.

Figure 7:
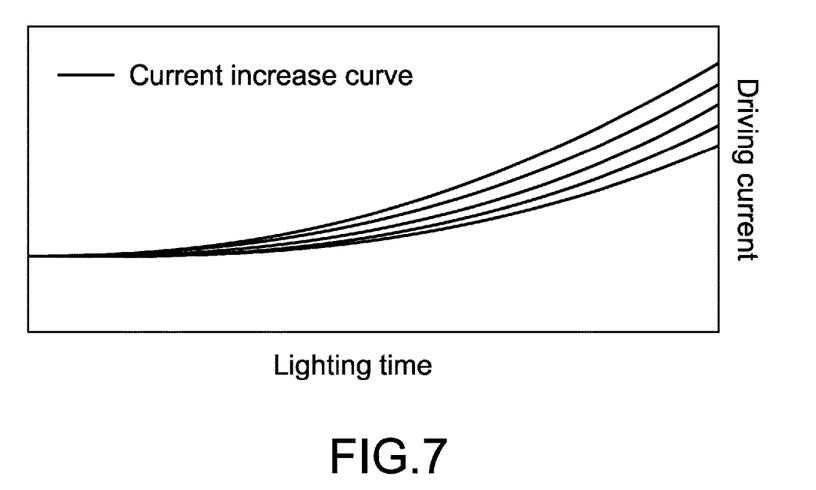
FIG. 7 is a current increase curve used by the control unit included in the projection type display device according to the embodiment of the present technology for determining the driving current.

Also, the storage unit 405 may include a plurality of current increase curves. FIG. 7 is a graph showing the plurality of current increase curves by the storage unit 405. As shown in the same figure, the plurality of current increase curves may have different slopes each other. In the same figure, although five current increase curves are shown, about ten current increase curves are desirable in fact.

The current value determination unit 402 may select one from the plurality of current increase curves on the basis of the temperature of each solid light source supplied from the temperature acquisition unit 403 and the voltage drop of each solid light source supplied from the voltage drop acquisition unit 404, and determine the driving current depending on the lighting time according to the selected current increase curve.

In this way, the current value determination unit 402 may know a lowering rate of an actual phototransformation efficiency of the solid light source 17 and the solid light source 61 from a difference between predicted temperature and voltage drop of the solid light source 17 and the solid light source 61 and the actual ones, and feed back to the current increase curve.

Specifically, the current value determination unit 402 may select the current increase curve having a greater slope when a lowering speed of the phototransformation efficiency of each solid light source is faster than expected, and select the current increase curve having a smaller slope when the lowering speed of the phototransformation efficiency of each solid light source is slower than expected.

Note that the current value determination unit 402 may select the current increase curve using any one of the temperature and the voltage drop of each solid light source. Also, the current value determination unit 402 may select the current increase curve using a measured value, from which the lowering rate of the phototransformation efficiency of each solid light source can be known other than the temperature and the voltage drop of each solid light source.

The current value determination unit 402 may determine the driving current using the same current increase curve to the solid light source 17 and the solid light source 61, but may determine the driving current using a different current increase curve to the solid light source 17 and the solid light source 61 separately.

Figure 8:
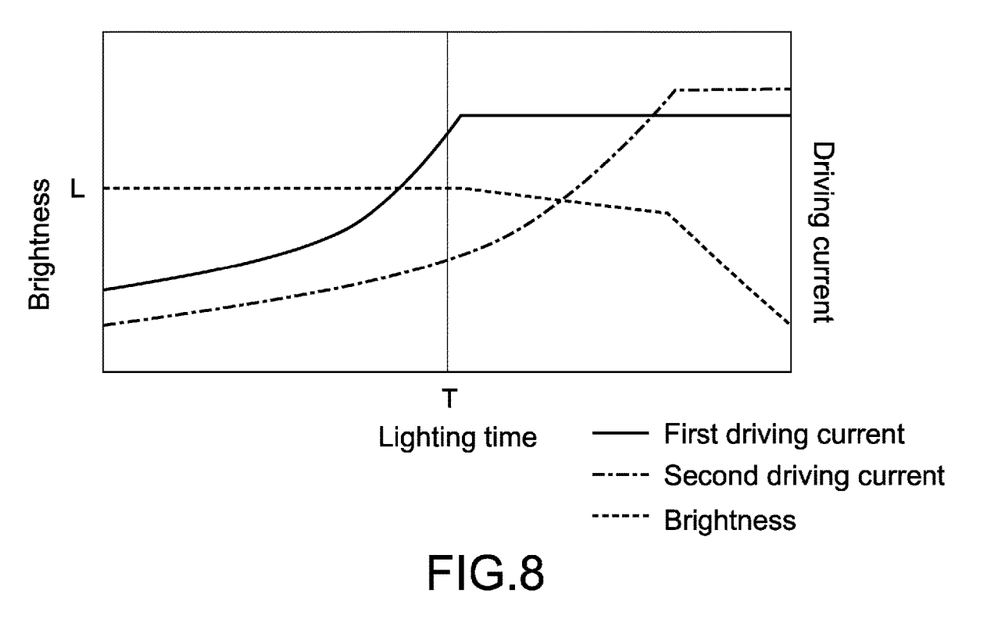
FIG. 8 is a graph showing a time change of a driving current vs a brightness of each of two solid-state light sources determined by the control unit included in the projection type display device.

FIG. 8 is a graph showing a time change of a driving current and a white light brightness of the solid light source 17 and the solid light source 61. In the figure, a first driving current is the driving current of the solid light source 17, and a second driving current is the driving current of the solid light source 61. As shown in the same figure, the current value determination unit 402 may also determine the driving current using the current increase curves that have different slopes, maximum values, times to reach the maximum values in the solid light source 17 that is a blue light source and the solid light source 61 that is an exciting light source.

The lowering rate of the phototransformation efficiency or the like may be different in the solid light source 17 and the solid light source 61. However, when the driving current is determined using the appropriate current increase curves by the current value determination unit 402, it will be possible to maintain the brightness uniform for a longer period.

Also, the control unit 400 may determine the driving current using the measured values acquired from the solid light source 17 and the solid light source 61. Specifically, the storage unit 405 includes the plurality of current increase curves about the solid light source 17 and the solid light source 61, and the current value determination unit 402 may select the current increase curve from the measured values of the temperature and the voltage drop about the solid light source 17 and the solid light source 61.

Figure 9:
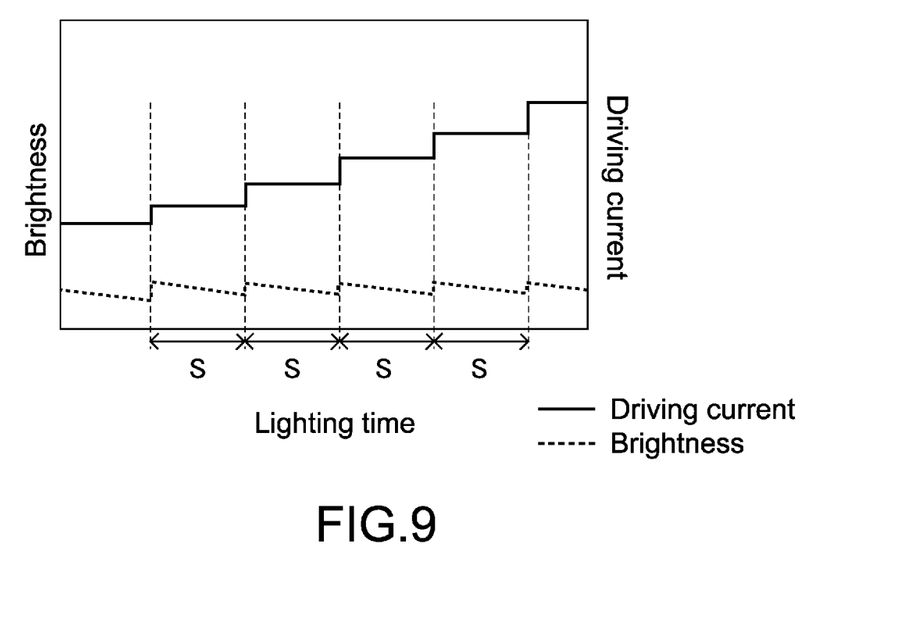
FIG. 9 is a graph showing a time change for a short period of time for a driving current of a solid-state light source vs a brightness determined by the control unit included in the projection type display device.

The control unit 400 performs the above-described operations. Further, in certain embodiments, the control unit 400 changes a duty cycle between light-on and light-off times of a solid-state light source, in addition or as an alternative to changing the amount of current supplied to the solid-state light source (e.g., the solid light source 17 and/or the solid light source 61), to maintain a brightness level of light output by the solid-state light source. Note that the current increase curves in the respective figures are in curved shapes, but may be in stepped shapes in a short period of time. FIG. 9 is a graph showing a time change for a short period of time about the driving current and the brightness, and is an enlarged view of FIG. 5. As shown in the same figure, the current increase curve may be in a curved shape where the current value is uniform within a time S, and the current value increases as the time S is elapsed. The time S is not especially limited, but may be 2000 hours, for example.

In this manner, the brightness is gradually decreased as the lighting time is elapsed in a short term view, but is increased every time S and can be uniform in a long term view.

It should be understood by those skilled in the art that various modifications, combinations, sub-combinations and alterations may occur depending on design requirements and other factors insofar as they are within the scope of the appended claims or the equivalents thereof.

The present technology may have the following configurations.

(1) A light source apparatus, including a first solid-state light source configured to output first light; and processing circuitry configured to control a power source to supply first current to the first solid-state light source, determine whether to change the supply of the first current to the first solid-state light source to maintain a brightness level of the first light output by the first solid-state light source at a first brightness level or within a first brightness level range, and control the power source to change the supply of the first current to the first solid-state light source to output the first light at the first brightness level or within the first brightness level range in response to a determination that the supply of the first current is determined to be changed.

(2) The light source apparatus according to feature (1), in which the processing circuitry is configured to control the power source to change an amount of the first current supplied to the first solid-state light source to maintain the brightness level of the first light output by the first solid-state light source.

(3) The light source apparatus according to feature (2), in which the processing circuitry is configured to control the power source to change the amount of the first current supplied to the first solid-state light source based on first predetermined current control information, the first predetermined current control information defining a relationship between the amount of the first current to be supplied to the first solid-state light source and a total on time of the first solid-state light source.

(4) The light source apparatus according to feature (3), in which the processing circuitry is configured to control the power source to increase the amount of the first current supplied to the first solid-state light source based on the first predetermined current control information.

(5) The light source apparatus according to feature (3) or (4), in which the processing circuitry is configured to select the first predetermined current control information from a plurality of predetermined current control information stored in a memory.

(6) The light source apparatus according to feature (5), in which each of the plurality of predetermined current control information indicates a pattern that includes a predetermined curve shape with different slope.

(7) The light source apparatus according to feature (5), in which at least one of the plurality of predetermined current control information includes a stepped shape.

(8) The light source apparatus according to any one of features (3) to (7), in which the processing circuitry is configured to control the power source to change the amount of the first current supplied to the first solid-state light source in consideration of at least one of temperature and voltage drop of the first solid-state light source.

(9) The light source apparatus according to any one of features (5) to (7), in which the processing circuitry is configured to select the first predetermined current control information from the plurality of predetermined current control information stored in the memory based on at least one of the temperature and the voltage drop of the first solid-state light source.

(10) The light source apparatus according to any one of features (5) to (9), in which the processing circuitry is configured to determine whether to change the amount of the first current supplied to the first solid-state light source when the light source apparatus is operating in a constant brightness mode, and control the power source to output a fixed amount of current to the first solid-state light source when the light source apparatus is operating in a normal mode; and the first predetermined current control information selected in the constant brightness mode and that selected in the normal mode are different.

(11) The light source apparatus according to any one of features (1) to (10), in which the processing circuitry is configured to control the supply of the first current from the power source to the first solid-state light source such that the first solid-state light source outputs the first light at the first brightness level or within the first brightness level range for a predetermined time period.

(12) The light source apparatus according to feature (11), in which the predetermined time period is at least 10,000 hours.

(13) The light source apparatus according to any one of features (1) to (12), in which the circuitry is configured to control the power source to increase an amount of the first current supplied to the first solid-state light source at predetermined time intervals.

(14) The light source apparatus according to any one of features (1) to (13), in which the processing circuitry is configured to control the power source to change a duty cycle between light-on and light-off times of the first solid-state light source when the supply of the first current to the first solid state light source is determined to be changed.

(15) The light source apparatus according to any one of features (1) to (14), further including a second solid-state light source configured to output second light.

(16) The light source apparatus according to feature (15), in which the first solid-state light source includes a first blue laser diode configured to emit blue light, the second solid-state light source includes a second blue laser diode, and a light of the second blue laser diode excites a phosphor that is configured to emit yellow or white light when irradiated by the blue light.

(17) The light source apparatus according to feature (15) or (16), in which the processing circuitry is configured to control the power source to supply second current to the second solid-state light source, and determine whether to change the supply of the second current to the second solid-state light source to maintain a brightness level of the second light output by the second solid-state light source at a second brightness level or within a second brightness level range.

(18) The light source apparatus according to any one of features (15) to (17), in which the circuitry is configured to control the power source to increase an amount of the first current supplied to the first solid-state light source based on first predetermined current control information associated with the first solid-state light source, the first predetermined current control information defining a relationship between the amount of the first current to be supplied to the first solid-state light source and a total on time of the first solid-state light source, and control the power source to increase an amount of second current supplied to the second solid-state light source based on a second predetermined current control information associated with the second solid-state light source, the second predetermined current control information defining a relationship between the amount of the second current to be supplied to the second solid-state light source and a total on time of the second solid state light source.

(19) A method of a controller for controlling a solid-state light source that is configured to output light, the method including controlling, by circuitry of the controller, a power source to supply current to the solid-state light source; determining, by the circuitry, whether to change the supply of the current to the solid-state light source to maintain a brightness level of the light output by the solid-state light source at a brightness level or within a brightness level range; and controlling, by the circuitry, the power source to change the supply of the current to the solid-state light source to output the light at the brightness level or within the brightness level range when the supply of the current is determined to be changed.

(20) A projector, including a housing; a solid-state light source configured to output light; an illumination optical unit that includes one or more mirrors to redirect the light and one or more lenses to direct the light; and processing circuitry configured to control a power source to supply current to the solid-state light source; determine whether to change the supply of the current to the solid-state light source to maintain a brightness level of the light output by the solid-state light source at a brightness level or within a brightness level range; and control the power source to change the supply of the current to the solid-state light source to output the light at the brightness level or within the brightness level range when the supply of the current is determined to be changed.

REFERENCE SIGNS LIST

10 B light source module
50 GR light source module
100 light source unit
101 light source driving unit
200 image generating unit
300 image projection unit
400 control unit
500 projection type display device
600 power source

The invention claimed is:
1. A light source apparatus, comprising:
a first solid-state light source configured to output first light; and
processing circuitry configured to:
control a power source to supply first current to the first solid-state light source,
determine, based on a total amount of elapsed time the first solid-state light source being ever used for lighting during the entire lifetime of the first solid-state light source, whether to change the supply of the first current to the first solid-state light source to maintain compensate a lowered photo transformation efficiency for maintaining a brightness level of the first light output by the first solid-state light source at a first brightness level or within a first brightness level range, and
control the power source to change the supply of the first current to the first solid-state light source to output the first light at the first brightness level or within the first brightness level range in response to a determination that the supply of the first current is determined to be changed.

2. The light source apparatus according to claim 1, wherein the processing circuitry is configured to
control the power source to change an amount of the first current supplied to the first solid-state light source to maintain the brightness level of the first light output by the first solid-state light source.

3. The light source apparatus according to claim 2, wherein the processing circuitry is configured to
control the power source to change the amount of the first current supplied to the first solid-state light source based on first predetermined current control information, the first predetermined current control information defining a relationship between the amount of the first current to be supplied to the first solid-state light source and a total on time of the first solid-state light source.

4. The light source apparatus according to claim 3, wherein the processing circuitry is configured to
control the power source to increase the amount of the first current supplied to the first solid-state light source based on the first predetermined current control information.

5. The light source apparatus according to claim 3, wherein the processing circuitry is configured to
select the first predetermined current control information from a plurality of predetermined current control information stored in a memory.

6. The light source apparatus according to claim 5, wherein each of the plurality of predetermined current control information indicates a pattern that includes a predetermined curve shape with a different slope.

7. The light source apparatus according to claim 5, wherein at least one of the plurality of predetermined current control information includes a stepped shape.

8. The light source apparatus according to claim 3, wherein the processing circuitry is configured to
control the power source to change the amount of the first current supplied to the first solid-state light source in consideration of at least one of a temperature and a voltage drop of the first solid-state light source.

9. The light source apparatus according to claim 6, wherein the processing circuitry is configured to
select the first predetermined current control information from the plurality of predetermined current control information stored in the memory based on at least one of a temperature and a voltage drop of the first solid-state light source.

10. The light source apparatus according to claim 5, wherein
the processing circuitry is configured to:
determine whether to change the amount of the first current supplied to the first solid-state light source when the light source apparatus is operating in a constant brightness mode, and
control the power source to output a fixed amount of current to the first solid-state light source when the light source apparatus is operating in a normal mode, wherein
the first predetermined current control information selected in the constant brightness mode and that selected in the normal mode are different.

11. The light source apparatus according to claim 1, wherein the processing circuitry is configured to
control the supply of the first current from the power source to the first solid-state light source such that the first solid-state light source outputs the first light at the first brightness level or within the first brightness level range for a predetermined time period.

12. The light source apparatus according to claim 11, wherein the predetermined time period is at least 10,000 hours.

13. The light source apparatus according to claim 1, wherein the circuitry is configured to
control the power source to increase an amount of the first current supplied to the first solid-state light source at predetermined time intervals.

14. The light source apparatus according to claim 1, wherein the processing circuitry is configured to
control the power source to change a duty cycle between light-on and light-off times of the first solid-state light source when the supply of the first current to the first solid-state light source is determined to be changed.

15. The light source apparatus according to claim 1, further comprising:
a second solid-state light source configured to output second light.

16. The light source apparatus according to claim 15, wherein
the first solid-state light source includes a first blue laser diode configured to emit blue light,
the second solid-state light source includes a second blue laser diode, and
a light of the second blue laser diode excites a phosphor that is configured to emit yellow or white light when irradiated by the blue light.

17. The light source apparatus according to claim 15, wherein the processing circuitry is configured to:
control the power source to supply second current to the second solid-state light source, and
determine whether to change the supply of the second current to the second solid-state light source to maintain a brightness level of the second light output by the second solid-state light source at a second brightness level or within a second brightness level range.

18. The light source apparatus according to claim 15, wherein the circuitry is configured to:
control the power source to increase a first amount of the first current supplied to the first solid-state light source based on first predetermined current control information associated with the first solid-state light source, the first predetermined current control information defining a relationship between the first amount of the first current to be supplied to the first solid-state light source and a first total on time of the first solid-state light source, and
control the power source to increase a second amount of second current supplied to the second solid-state light source based on a second predetermined current control information associated with the second solid-state light source, the second predetermined current control information defining a relationship between the second amount of the second current to be supplied to the second solid-state light source and a second total on time of the second solid-state light source.

19. A method of a controller for controlling a solid-state light source that is configured to output light, the method comprising:
controlling, by circuitry of the controller, a power source to supply current to the solid-state light source;
determining, by the circuitry, based on a total amount of elapsed time the solid-state light source being ever used for lighting during the entire lifetime of the solid-state light source, whether to change the supply of the current to the solid-state light source to compensate a lowered photo transformation efficiency for maintaining a brightness level of the light output by the solid-state light source at a brightness level or within a brightness level range; and controlling, by the circuitry, the power source to change the supply of the current to the solid-state light source to output the light at the brightness level or within the brightness level range when the supply of the current is determined to be changed.

20. A projector, comprising:

a housing;

a solid-state light source configured to output light;

an illumination optical unit that includes one or more mirrors to redirect the light and one or more lenses to direct the light; and processing circuitry configured to:
  control a power source to supply current to the solid-state light source;
  determine, based on a total amount of elapsed time the solid-state light source being ever used for lighting during the entire lifetime of the solid-state light source, whether to change the supply of the current to the solid-state light source to compensate a lowered photo transformation efficiency for maintaining a brightness level of the light output by the solid-state light source at a brightness level or within a brightness level range; and
  control the power source to change the supply of the current to the solid-state light source to output the light at the brightness level or within the brightness level range when the supply of the current is determined to be changed.

* * * * *